Dec. 14, 1926.

E. L. CHAFFEE 1,610,425

TRANSMISSION SYSTEM FOR RADIANT ENERGY

Original Filed Sept. 3, 1918      4 Sheets-Sheet 1

WITNESSES
Chas. F. Clagett

INVENTOR
Emory Leon Chaffee
BY
A. G. Gardner
HIS ATTORNEY

Dec. 14, 1926.
E. L. CHAFFEE
1,610,425
TRANSMISSION SYSTEM FOR RADIANT ENERGY
Original Filed Sept. 3, 1918   4 Sheets-Sheet 2
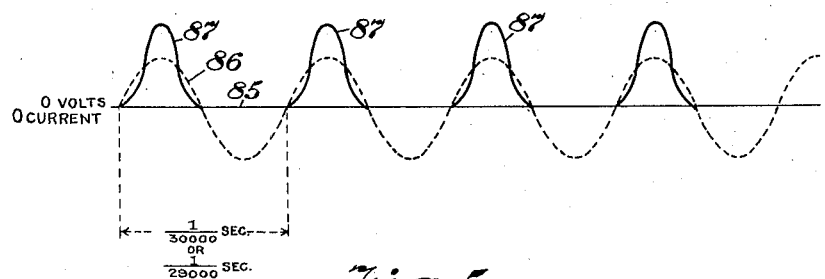
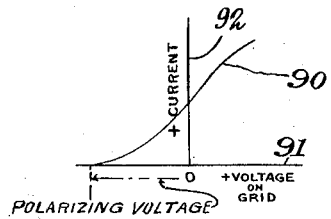
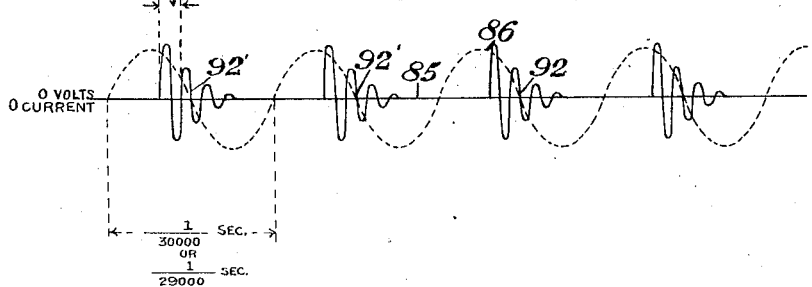

Dec. 14, 1926.

E. L. CHAFFEE 1,610,425

TRANSMISSION SYSTEM FOR RADIANT ENERGY

Original Filed Sept. 3, 1918   4 Sheets-Sheet 3

INVENTOR
Emory Leon Chaffee
BY
A. S. Gardner
ATTORNEY

Dec. 14, 1926.

E. L. CHAFFEE 1,610,425

TRANSMISSION SYSTEM FOR RADIANT ENERGY

Original Filed Sept. 3, 1918    4 Sheets-Sheet 4

INVENTOR
Emory Leon Chaffee
BY
A. I. Gardner
HIS ATTORNEY

Patented Dec. 14, 1926.

1,610,425

UNITED STATES PATENT OFFICE.

EMORY LEON CHAFFEE, OF BELMONT, MASSACHUSETTS, ASSIGNOR TO JOHN HAYS HAMMOND, OF GLOUCESTER, MASSACHUSETTS.

TRANSMISSION SYSTEM FOR RADIANT ENERGY.

Application filed September 3, 1918, Serial No. 252,400. Renewed February 10, 1925.

Some of the objects of this invention are to provide an improved transmission system whereby a high degree of selectivity may be secured and which will insure a high degree of secrecy in transmitting messages; to provide an improved transmission system for producing periodic electroradiant wave trains having a predetermined high wave or primary frequency, as for instance a wave frequency of 1,000,000 per second and having a high but variable train secondary frequency, as for instance a train or secondary frequency of 30,000 wave trains per second; and to provide other improvements as will appear hereinafter.

Figure 1:
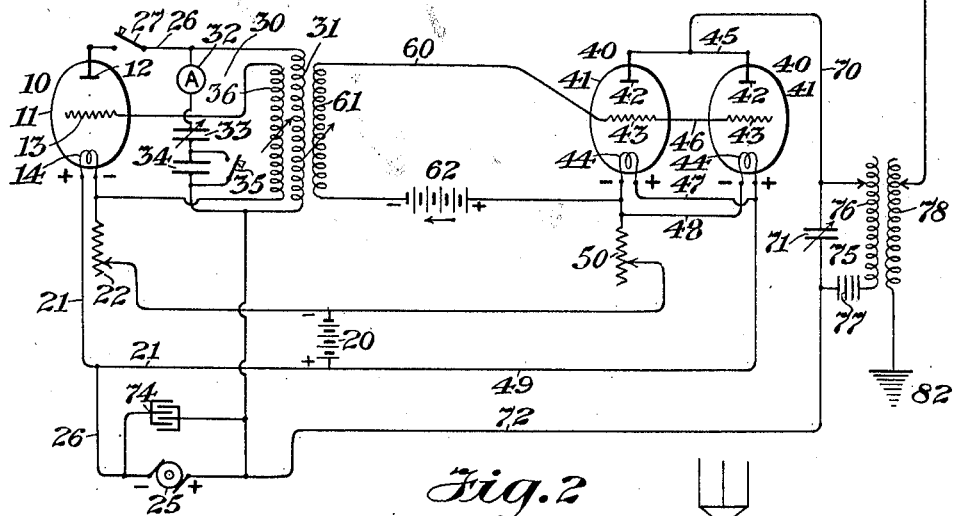
Figure 2:
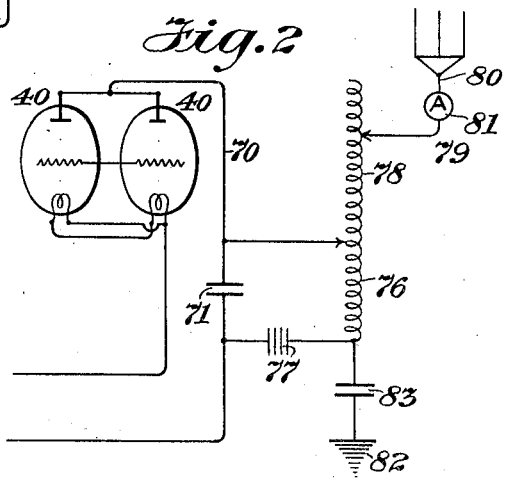
Figure 3:
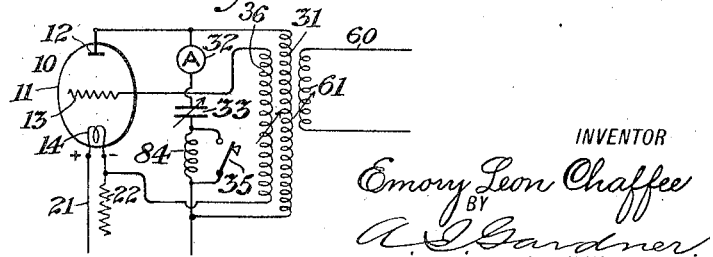
Figure 7:
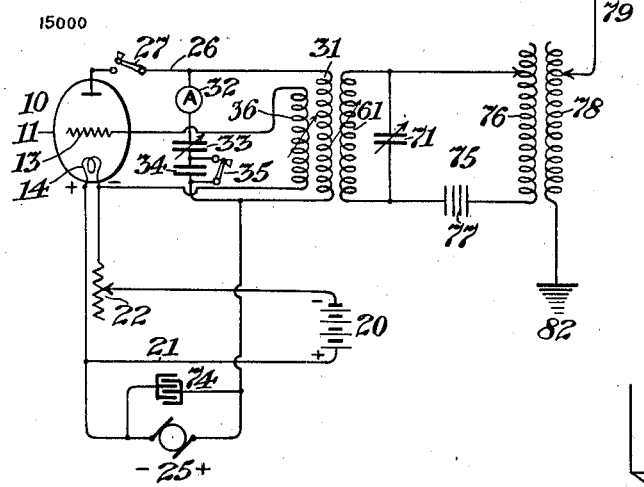
Figure 8:
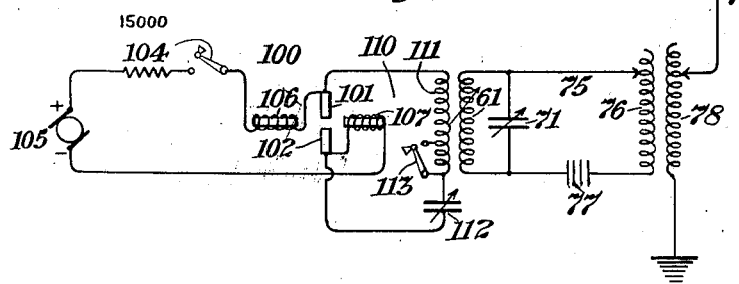
Figure 9:
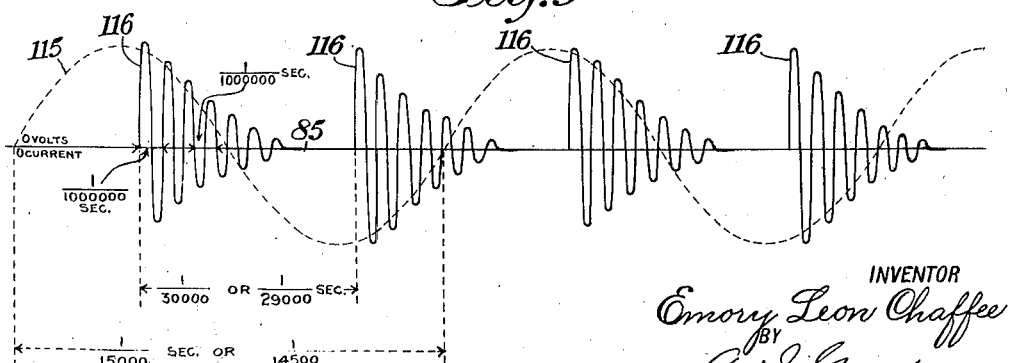
Figure 10:
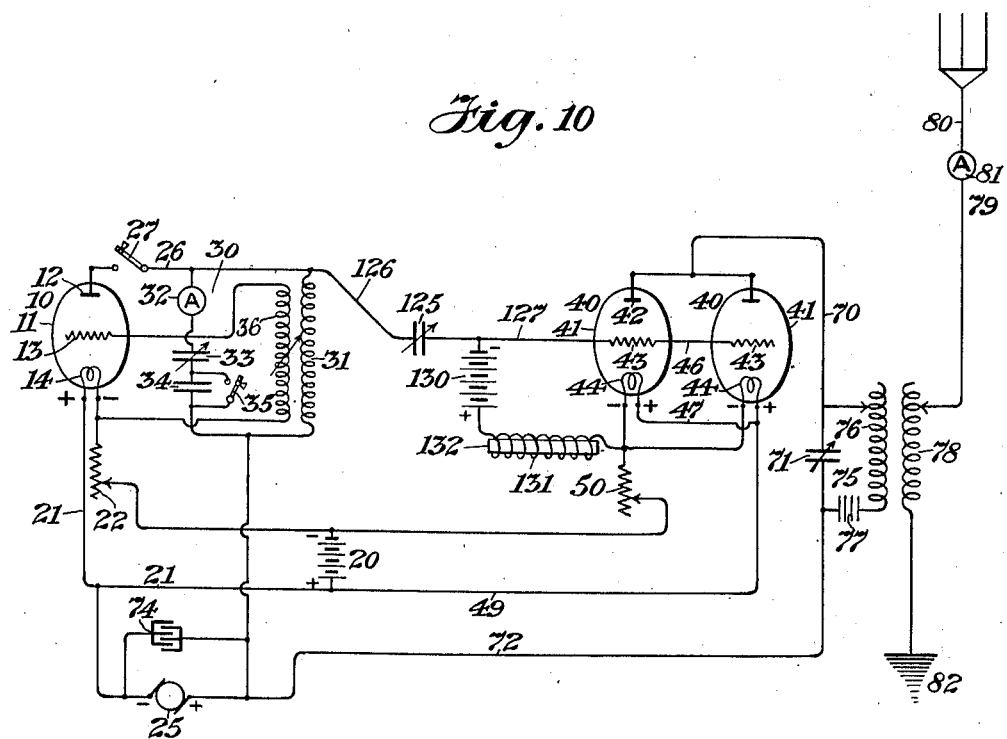
Figure 11:
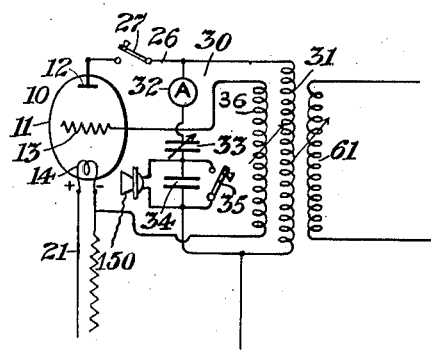

In the accompanying drawings, Fig. 1 is a diagrammatic side elevation of a transmission system constructed in accordance with this invention; Figs. 2 and 3 are fragmentary diagrammatic side elevations of modified portions of the same; Figs. 4, 5 and 6 are diagrams explanatory of the operation of the same; Figs. 7 and 8 are diagrammatic side elevations of modified transmission systems constructed in accordance with this invention; Fig. 9 is a diagram explanatory of the operation of the systems shown in Figs. 7 and 8; Fig. 10 is a diagrammatic side elevation of a further modified transmission system constructed in accordance with this invention; and Fig. 11 is a fragmentary diagrammatic side elevation of a modified form of a portion of Fig. 10.

Referring to the drawings, and particularly to Fig. 1, one embodiment of this invention comprises any well known or suitable means for producing electrical oscillations having a frequency equal to the desired secondary frequency of the system. In the form shown in Fig. 1 the means provided for this purpose includes a control oscillator 10, which may be of any suitable construction, and which in the form shown is of well known construction comprising a thermionic valve including an evacuated glass bulb containing a plate 12, a grid 13 and a filament 14. The filament 14 is arranged to be heated by a battery 20 the positive pole of which is connected to the positive end of the filament by a conductor 21, and the negative pole of which is connected to the negative end of the filament 14 through a variable resistance 22 whereby the current from the battery through the filament 14 may be controlled.

For supplying electrical energy to the control oscillator 10, a high-voltage, direct-current electrical generator 25 or other suitable source of electrical energy is arranged in a circuit 26, generally known as the "plate circuit", which is controlled by a switch 27, and which includes and is also controlled by the control oscillator 10, the negative pole of the generator being connected to the positive end of the filament 14. The voltage of the generator 25 may be 800 or more, preferably above 1000.

Interposed in the plate circuit 26 of the control oscillator 10 is an oscillatory circuit 30 comprising a fixed inductance 31, a hot wire ammeter or other suitable ammeter 32, a relatively small variable capacity 33 and a relatively large fixed capacity 34, the latter being shunted by an operator's key 35 whereby the "dots" and "dashes" of any suitable code may be transmitted. The parts of this oscillatory circuit 30 are preferably so proportioned that when the key 35 is open the circuit will have a natural frequency of oscillation of, for instance, 30,000 oscillations per second, and so that when the key 35 is closed, thus short circuiting the fixed capacity 34, the circuit will have a natural frequency of, for instance, 29,000 oscillations per second. Both of these frequencies are preferably above audibility to add to the secrecy and selectivity of the system and to avoid interference.

For causing the oscillator 10 to oscillate at for instance 30,000 oscillations per second, an inductance 36 is inductively and adjustably coupled to the inductance 31 of the oscillatory circuit 30. This adjustable inductance 36 is electrically connected at one end to the grid 13 and at its other end to the negative end of the filament 14. After the adjustable inductance 36 has been suitably adjusted with respect to the fixed inductance 31, the adjustable inductance may be held fixed in position by any suitable means.

For producing under the control of the electrical oscillations generated by the control oscillator 10 periodic groups or trains of electrical oscillations having an oscillative or primary frequency above the frequency of the oscillations generated by the control oscillator 10 and periodically varied to form groups having a group or secondary frequency controlled by and substantially equal to the frequency of the oscillations produced by the control oscillator 10, any suitable means may be provided. In the form of this invention shown in Fig. 1 the means provided for this purpose includes two thermionic valves 40. Each of these valves 40 is the same in construction as the control oscillator 10 and each includes an evacuated glass bulb 41 and a plate 42, a grid 43 and a filament 44 enclosed thereby. The plates 42 are electrically connected by a conductor 45; the grids 43 are electrically connected by a conductor 46; the positive ends of the filaments 44 are electrically connected by a conductor 47; and the negative ends of the filaments 44 are electrically connected by a conductor 48. The filaments 44 are arranged to be heated by the battery 20, the positive ends of the filaments being connected by a conductor 49 to the positive pole of the battery 20, and the negative ends of the filaments being connected to the negative pole of the battery 20 through a variable resistance 50 whereby the current through the filaments may be controlled. The valves 40 are thus connected in parallel to increase the current capacity over the current that could be carried by either valve acting alone. Instead of having two valves 40, as shown in Fig. 1, it will be evident that only a single valve 40 or three or more valves 40 might be used to perform the function of the two valves 40 shown without otherwise changing the system and without affecting its mode of operation.

For controlling the valves 40 and for normally impressing upon the grids 43 of the valves 40 an initial negative voltage, these grids are electrically connected through a conductor 60 and an adjustable inductance 61 to the negative pole of a polarized battery 62 of any suitable construction, the positive pole of which is connected to the negative ends of the filaments 44 of the valves 40. This polarized battery 62 may be in the form of small dry cells or may even be in the form of small storage cells since all current flow through them is ordinarily in the direction of the arrow shown below the battery and hence in a direction to keep them charged. The battery 62 is so selected that when the control oscillator 10 is not in operation the polarizing potential of the battery 62 will be of such a value that the grids 42 will be maintained at just such a negative potential that no current will be permitted to flow through the valves 40.

The auxiliary thermionic valves 40 control a "plate" circuit which includes a conductor 70 which leads from the conductor 45, connecting the plates 42 of the valves, to one terminal of a condenser or capacity 71, the other terminal of which is connected by a conductor 72 to the positive pole of the generator 25. The condenser 71 is thus arranged to be periodically charged under the control of the valves 40.

To permit the current in the "plate" circuits, controlled by the control oscillator 10 and the auxiliary valves 40 and receiving energy from the generator 25, to oscillate at the required high frequencies of, for instance, 1,000,000 per second and 30,000 per second, the generator 25 is shunted by a relatively large capacity 74.

For transforming the unidirectional impulses in the "plate" circuit 70 into aerial oscillations, an oscillatory circuit 75 is provided by connecting a variable primary inductance 76 and a discharge gap device 77 across the condenser 71. The gap device 77 is preferably of a well known quenched gap type, but may be in the form of a discharger such as a well known mercury vapor gap, or may be of any other well known or suitable construction. The primary inductance 76 is coupled to a secondary variable inductance 78 which is in an open aerial circuit 79 which includes an antenna 80, and a hot wire ammeter 81 or other suitable ammeter and which is grounded through the secondary inductance as at 82. The capacity 71 and the inductance 76 are so proportioned that when the system is in operation electrical oscillations having a predetermined frequency of for instance 1,000,000 per second will be induced in the open aerial circuit 79.

As shown in Fig. 2, instead of inductively coupling the primary inductance 76 to the secondary inductance 78 of the open aerial circuit 79, as shown in Fig. 1, this primary inductance 76 may be directly coupled to the secondary inductance 78. In the latter case a condenser 83 is usually inserted between the secondary coil 76 and the ground 82 to prevent a short circuiting of the system by an accidental grounding of any other parts of the system. In all other details the system which is shown in part in Fig. 2 might be the same as shown in Fig. 1.

As shown in Fig. 3, the system shown in Fig. 1 may be modified by substituting for the relatively large capacity 34 a corresponding inductance 84 without otherwise changing the construction of the system. When the inductance 84 is thus substituted for the capacity 34, the closing of the key 35 and consequent short circuiting of the inductance 84 raises the superposed or secondary frequency of the system instead of lowering it as is the case when the capacity 34 is used.

In the operation of the transmission system shown in Fig. 1, and hereinbefore described, when the key 27, which is normally left open when the system is not in operation, is closed, electrical oscillations will be produced in the circuit 30 and these oscillations will have either the predetermined frequency of, for instance, 30,000 per second or of 29,000 per second depending upon whether the operator's key 35 is open or closed. Electrical oscillations of the same frequency will then be induced in the inductance 61 and will act upon the grids 43 of the auxiliary valves 40, 40.

The voltage of these oscillations will be alternately negative and positive. During each half cycle that a negative potential is thus induced in the inductance 61 it will be added to the negative voltage normally maintained upon the grids 43 by the battery 62 and will thus increase the negative voltage on the grids and prevent any current from flowing through the auxiliary valves 40. But during each half cycle that a positive voltage is thus acting upon the inductance 61, such positive voltage will reduce accordingly the normal negative potential of the grids 43 with respect to the filaments 44, and may even make the potential of the grids positive with respect to the filaments. Consequently, during each of these positive half cycles of the oscillations acting inductively through the inductance 31 upon the inductance 61 a unidirectional positive current will be permitted to flow from the generator 25 through the auxiliary valves 40 and into the condenser 71, as shown by the full curved lines in Fig. 4 which will be further explained hereinafter.

The condenser 71 thus becomes periodically charged at a frequency equal to the frequency of the oscillations set up in the inductance 31 by the action of the control oscillator, for instance at a predetermined frequency either of 30,000 per second or of 29,000 per second depending upon whether the operator's key 35 is open or closed. The gap device 77 is preferably so adjusted that a single discharge will occur in the circuit including the condenser 71, the primary inductance 76 and the gap device 77 for every time that the condenser 71 is charged.

These single discharges of the condenser 71 induce single wave trains in the open aerial circuit 79, as shown by the full curved lines in Figs. 6 and 9, which will be further explained hereinafter. These wave trains have a high wave frequency of, for instance, 1,000,000 oscillations per second, and have a group or secondary frequency of, for instance, 30,000 or 29,000 groups per second, depending upon whether the operator's key 35 is open or closed. The high frequency wave is sometimes identified as the carrier wave, and the wave producing or corresponding to the secondary frequency is sometimes identified as the superposed wave. The high and secondary frequencies are also sometimes referred to as the carrier and superposed frequencies respectively. The high frequency or frequency of the carrier wave in this case is determined by the electrical constants of the oscillatory circuit 75 and the secondary frequency or superposed frequency is determined in this case by the electrical length or natural frequency of oscillation of the oscillatory circuit 30 controlled by the control oscillator 10.

The wave trains thus set up in the open circuit 79 cause corresponding wave trains of electroradiant energy to be emitted by the antenna 80. By opening or closing the key 35 the operator may thus cause to be emitted by the antenna 80 a carrier wave having a high frequency of, for instance, 1,000,000 per second and a secondary or superposed frequency of, for instance, either 30,000 or 29,000 per second, and by suitably manipulating the key 35 may cause the carrier wave having either secondary frequency impressed thereon to be sent out in the form of dots and dashes to transmit any desired message.

When this improved transmission system is in operation, periodic trains of high frequency electroradiant waves are continuously emitted, having the predetermined high wave frequency of, for instance, 1,000,000 per second, and having normally either selected one of the two predetermined train or superposed frequencies of 30,000 or 29,000. The messages or signals are then sent by changing from time to time the normal superposed or secondary frequency, to the other superposed frequency, as, for instance, by changing the superposed frequency from 30,000 to 29,000 per second, so as to send the message or signal in dots and dashes of the latter superposed frequency.

It is evident that instead of sending the messages as just described, by slightly varying the superposed frequency under the control of the key 35, the messages might be sent by leaving the key 35 continuously either in an open or in a closed position and then sending the messages by opening and closing the other key 27 from time to time, thus interrupting the periodic trains of waves having a predetermined constant high frequency and a predetermined constant superposed frequency, to form dots and dashes without changing the superposed frequency.

The waves thus emitted by the antenna 80 may be received on any suitable receiving system having an open aerial receiving circuit and a circuit controlled thereby which are tuned respectively to the high and to that one of the superposed frequencies of the received waves which is selected for sending the signals or messages.

Fig. 4 shows diagrammatically the electrical effect produced in the plate circuit 70 of the valves 40 as a result of the action of the control oscillator 10 and the auxiliary valves 40. The full straight line 85 in Fig. 4 and also in Figs. 6 and 9 is the line of zero voltage or current, distances above and below the line 85 representing positive and negative values respectively and distances parallel to the line 85 representing corresponding variations of time. The dotted line 86 represents approximately the electro-motive force acting upon the inductance 61 from the inductance 31, and the full curved lines 87 represent approximately the corresponding periodic unidirectional current impulses which flow in the plate-circuit 70 and into condenser 71. The electrical oscillations indicated by the dotted line 86 have a frequency, for instance, either of 30,000 or of 29,000 per second depending upon whether the key 35 is open or closed and the resultant impulses 87 have the same frequency. The curved lines 87 are rounded off at their lower ends on account of the characteristic action of the electronic valves 40, 40, as explained hereinafter.

In Fig. 5 the full curved line 90 represents approximately the characteristic curve of operation of a standard thermionic valve of the type shown in Fig. 1, voltage on the grid being measured along the horizontal line 91 and corresponding current through the valve being measured along the vertical line 92. The rounding of the curve 90 at its lower end explains the rounding of the lower ends of the curves 87 of Fig. 4.

In Fig. 6 the full curved lines 92' represent the periodic wave trains of electrical current set up in and consequently radiated from the antenna 80, and the horizontal line 85 and the dotted curved line 86 have the same significance as in Fig. 4. Fig. 6 shows approximately the time and intensity relations between the high frequency or carrier-wave current 92' and the secondary or superposed-wave voltage 86.

It is to be understood that no effort has been made to have the diagrams shown in Figs. 4, 5 and 6 mathematically correct as these diagrams are used merely as explanatory of the theory which is advanced herein as to the operations of the transmission system.

Some of the advantages of this improved system are that it is comparatively simple and inexpensive in construction and that it operates with a high degree of efficiency and with great regularity. The fact that in the operation of this system only a single train of electroradiant waves is produced for each cycle of the superimposed or secondary wave is one of the reasons why the system is highly efficient; and the fact that the superposed wave or frequency of the system is derived from a control oscillator 10 is one of the reasons why the system is extremely regular in its operation. The control oscillator 10 controls the time of the discharge of the gap device 77 and renders it regular even though under different conditions the gap device might be irregular in its time or rate of discharge.

In Fig. 7 is shown a modified form of this invention in which the construction is substantially the same as shown in Fig. 1, except that the auxiliary valves 40 and battery 62 have been omitted and the ends of the secondary coil 61 have been electrically connected directly to the terminals of the condenser 71. Also the oscillator 10 of Fig. 7 should be much more powerful than the oscillator 10 of Fig. 1, and the oscillatory circuit 30 of Fig. 7 should be adjusted to oscillate at one-half the frequency of the circuit 30 of Fig. 1, to produce the same primary and secondary oscillation frequencies in the open circuit 79 of Fig. 7 as are produced in the open aerial circuit 79 of Fig. 1. For instance, the circuits of the oscillator 10 of Fig. 7 may be so adjusted that when the switch 27 is closed oscillations of, for instance, either 15,000 or 14,500 per second, depending upon whether the key 35 is open or closed, will be set up in the inductance 31, and the closed oscillatory circuit 75 and the open aerial circuit 79 may be so adjusted that the oscillations of 15,000 or 14,500 per second induced in the secondary inductance 61 will cause a periodic charge and discharge of the condenser 71 at the rate of 30,000 or 29,000 per second and in such a manner as to cause the open aerial circuit to emit periodic electroradiant wave trains having a high wave or primary frequency of, for instance, 1,000,000 per second and a train or secondary frequency of, for instance, 30,000 or 29,000 per second depending upon whether the key 35 is open or closed.

In the modified form of this invention shown in Fig. 8 the construction is substantially the same as that shown in Fig. 7 except that instead of the thermionic oscillator 10 and its connections shown in Fig. 8, a Poulsen arc system 100 is substituted for producing the electrical oscillations of the predetermined secondary frequencies of, for instance, 15,000 and 14,500 per second. The Poulsen arc system may be of any suitable construction and in the form shown is of well known construction comprising two oppositely disposed arc terminals 101 and 102 formed respectively of copper and carbon or of any other suitable materials. The terminals are arranged in series in a circuit containing a 500 volt direct current electrical generator 105 or any other suitable source of direct current and a pair of oppositely disposed electromagnets 106 and 107 arranged to act in a well known manner upon the arc between the terminals 101 and 102. The terminals 101 and 102 are also arranged in an oscillatory circuit 110 including a primary inductance 111 and a variable condenser or capacity 112. A key 113 is arranged to short-circuit a portion of the primary inductance 111. The oscillatory circuit 110 is so adjusted that when the switch 104 is closed electrical oscillations of either 14,500 or 15,000 per second will be produced in the oscillatory circuit 110, depending upon whether the key 113 is open or closed. The primary inductance 111 is inductively coupled to the secondary inductance 61, and consequently the oscillations set up in the primary inductance 111 will cause corresponding oscillations in the secondary inductance 61 and these will act to charge and discharge the condenser 71 periodically to cause trains of electroradiant oscillations to be emitted from the open aerial circuit 79 having a high wave frequency of, for instance, 1,000,000 per second and a wave train or secondary frequency of, for instance, 29,000 or 30,000 per second, depending upon whether the key 113 is open or closed.

It is well known that the efficiency of a Poulsen arc, such, for instance, as is shown at 100 in Fig. 8, is much higher when the arc is operated at a comparatively low frequency, as, for instance, 15,000 oscillations per second, than when it is operated at a comparatively high frequency, and for this reason among other reasons the Poulsen arc has not been used heretofore in generating electroradiant oscillations having a high frequency. It is evident, however, that this invention in the form shown in Fig. 8, provides a system whereby a Poulsen arc may be operated at a comparatively low frequency and consequent high efficiency to produce electroradiant oscillations of the comparatively high frequency now generally in use.

Fig. 9 illustrates diagrammatically the operation of the modified systems shown in Figs. 7 and 8. In Fig. 9 the full horizontal line 85 has the same significance as in Figs. 4 and 6. The dotted line 115 indicates approximately the electromotive force acting either through the primary inductance 31 upon the secondary inductance 61 of Fig. 7 or through the primary inductance 111 upon the secondary inductance 61 of Fig. 8, and the full curved lines 116 indicate approximately the consequent periodic wave trains of electrical current which are set up in and consequently radiated from the open aerial circuit 79 either of Fig. 7 or of Fig. 8. Fig. 9 shows approximately the time and intensity relations between the high frequency or carrier wave current 116 and the secondary or superposed wave voltage 115 of the waves generated in and radiated by either of the systems shown in Figs. 7 and 8.

In the modified form of transmission system shown in Fig. 10 the construction is the same as that shown in Fig. 1 except that instead of coupling the primary inductance magnetically to the valves 40 as in Fig. 1, the primary inductance 31 is directly connected to the grids 43 of the valves 40 through a variable condenser 125, one side of the condenser 125 being connected to the primary inductance 31 by a conductor 126, and the other side of the condenser 125 being connected to the grids 43 by a conductor 127. The latter conductor is connected to the negative terminals of the filaments 44 of the valves 40 through a circuit which includes a polarized battery 130 and a choke coil 131 surrounding a soft iron core 132. In this form of the invention the battery 130 may be of the same construction as the hereinbefore described battery 62 and is arranged to perform the same function of normally maintaining just such a negative potential on the grids 43 that when the oscillator 10 is not in operation no current will be permitted to pass through the valves 40. When oscillations are produced in the inductance 31 by the control oscillator the valves 40 will be operated to cause the open aerial circuit to emit periodic trains of electroradiant oscillations as hereinbefore described.

The modified system shown in part in Fig. 11 is identical in construction, adjustment, and operation with the system shown in Fig. 1 except that to permit the system to be used in transmitting either telegraph or telephone messages, a telephone transmitter or microphone transmitter 150 is added to the system by placing it in shunt around the condenser 34. In this modified system when it is desired to send a telephone message, the operator speaks into the transmitter 150 and this modifies the action of the condenser 34 to vary the secondary frequency of the emitted waves of radiant energy as a result of and in accordance with the various sounds acting upon the transmitter 150. The radiant waves thus varied may be received upon any well known or suitable receiving system to reproduce in a telephone receiver the sounds acting upon the transmitter 150.

In all of the systems hereinbefore described the construction is preferably such that both the primary or carrier frequency and secondary or imposed frequency of the oscillations produced are above the highest frequency of sound waves which are audible to the ordinary operator. By having both frequencies thus above audibility it has been found that a sharper tuning and consequent greater selectivity and efficiency of the receiving circuits may be maintained, and that it is rendered extremely difficult without the use of complicated and expensive apparatus for a hostile or foreign station to interfere with the messages which are being transmitted. Also by having both the primary and secondary frequencies of the system above audibility it is possible as shown in Fig. 11, to adapt and utilize the system for transmitting either telegraphic or telephonic messages by slight variations in the secondary or group frequency of the system.

A further, and one of the more important advantages of this improved system is that in transmitting either telegraphic or telephonic messages by this system a high degree of secrecy is maintained as the messages, both telegraphic or telephonic, are produced by slight variations in the secondary or group frequency which is above audibility and while the carrier or high frequency primary wave remains constant in frequency and amplitude.

A further and extremely important advantage of this improved system is that by various combinations in the magnitudes of the high and secondary frequencies of the system a very much larger number of differently tuned transmitting and receiving systems may be simultaneously operated without interference in a given zone or area than is possible with the systems now generally in use.

Although only a few of the forms in which this invention may be embodied have been shown herein, it is to be understood that the invention is not limited in its application to any specific construction but might be embodied in various forms without departing from the spirit of the invention or the scope of the appended claims.

Having thus fully described my invention, what I claim is:

1. A transmission system for electrical waves comprising an electrical valve including a cathode, an anode and a terminal between said cathode and said anode, a circuit including a source of energy and an inductance connecting said cathode and said terminal, a circuit including a condenser and a source of energy connecting said anode and said cathode, a circuit shunted around said condenser, including a spark gap, an inductance and an open aerial circuit operatively connected to said last mentioned inductance, and a source of electrical oscillations inductively connected to said first mentioned inductance.

2. In a wave transmission system, the combination with a condenser of a spark gap in series therewith, a thermionic valve, and a source of energy included in the output circuit of said valve, said condenser being conductively connected to receive energy from said source through said valve.

3. In a wave transmission system, the combination with a condenser of a spark gap in series therewith, a thermionic valve including a filament for emitting electrons, a plate upon which the electrons impinge and a grid for controlling the passage of electrons, and a source of energy included in the plate circuit of said valve, said condenser being conductively connected to receive energy from said source through said valve.

4. In a wave transmission system, the combination with a condenser of a spark gap in series therewith, a thermionic valve comprising a heated cathode, an anode and potential gradient changing means, and a source of energy of constant polarity included in the anode circuit of said valve, said condenser being conductively connected to receive energy from said source through said valve.

5. A transmission system for electrical waves comprising an electrical valve having a heated cathode, an anode and a grid between said cathode and said anode, a source of energy included in the circuit connecting said cathode and said anode, said circuit including a condenser, and a shunt path bridged around said condenser, said shunt path including a spark gap, and an open aerial circuit inductively connected to said shunt path.

6. In a wave transmission system, means for producing oscillations of a frequency such as to enable them to be readily amplified, a vacuum tube controlled by and for amplifying the oscillations and means coupled with the output circuit of said tube for producing oscillations of a much higher frequency than the first-mentioned oscillations.

7. In a wave transmission system, a vacuum tube oscillator arranged to produce oscillations of a frequency such that they may be readily amplified, a three-electrode vacuum tube for amplifying the oscillations, devices coupled with the output circuit of said latter tube for producing oscillations of much higher frequency than that of the first-mentioned oscillations, and an aerial for radiating said last-mentioned oscillations.

8. In a wave transmission system, means for producing oscillations of a readily-amplifiable frequency, means for amplifying the oscillations and means for utilizing said oscillations to produce oscillations of a higher frequency, said means including a condenser conductively connected to be charged with energy in accordance with the first-mentioned oscillations and an oscillating circuit including an inductance and a spark gap connected in series with the condsenser.

9. In a wave transmission system, means for producing oscillations of a frequency such as to enable them to be readily amplified, a three-electrode vacuum tube amplifier for amplifying the oscillations, and means for utilizing said oscillations to produce oscillations of a higher frequency including a condenser interposed in the plate-filament circuit of the amplifier so as to be charged with energy in accordance with the first-mentioned oscillations and an oscillating circuit including said condenser, an inductance and a spark gap.

Signed at Cambridge, in the county of Middlesex and State of Massachusetts, this 29th day of August A. D. 1918.

EMORY LEON CHAFFEE.